United States Patent
Fu

(10) Patent No.: US 11,159,341 B2
(45) Date of Patent: Oct. 26, 2021

(54) FORWARDING PACKET

(71) Applicant: NEW H3C TECHNOLOGIES CO., LTD., Hangzhou (CN)

(72) Inventor: Zhihua Fu, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 403 days.

(21) Appl. No.: 16/461,563

(22) PCT Filed: Nov. 14, 2017

(86) PCT No.: PCT/CN2017/110883
§ 371 (c)(1),
(2) Date: May 16, 2019

(87) PCT Pub. No.: WO2018/090907
PCT Pub. Date: May 24, 2018

(65) Prior Publication Data
US 2020/0067731 A1    Feb. 27, 2020

(30) Foreign Application Priority Data

Nov. 17, 2016  (CN) .......................... 201611033162.0

(51) Int. Cl.
*H04L 12/46* (2006.01)
*H04L 12/703* (2013.01)
*H04L 12/741* (2013.01)

(52) U.S. Cl.
CPC ...... *H04L 12/4641* (2013.01); *H04L 12/4633* (2013.01); *H04L 45/28* (2013.01); *H04L 45/74* (2013.01)

(58) Field of Classification Search
None
See application file for complete search history.

(56) References Cited

U.S. PATENT DOCUMENTS

2015/0009992 A1   1/2015  Zhang
2015/0124586 A1   5/2015  Pani
(Continued)

FOREIGN PATENT DOCUMENTS

CN    103166858 A    6/2013
CN    104270298 A    1/2015
(Continued)

OTHER PUBLICATIONS

ISA State Intellectual Property Office of the People's Republic of China, International Search Report Issued in Application No. PCT/CN2017/110883, dated Feb. 1, 2018, WIPO, 4 pages.
(Continued)

*Primary Examiner* — Robert M Morlan
(74) *Attorney, Agent, or Firm* — Greenblum & Bernstein, P.L.C.

(57) ABSTRACT

A method of forwarding a packet and a VXLAN Tunnel End Point (VTEP) are provided. In an example, the VTEP obtains a route of a specified role, which is advertised to a remote VTEP. Then the remote VTEP distributes packets to be transmitted to the specified role to VTEPs in a multi-homing group based on the route. The multihoming group includes VTEPs that the specified role is homed to, and next hop of the route is a group address of the multihoming group. The VTEP receives the packet to be transmitted to the specified role from the remote VTEP; and transmits the packet to another VTEP in the multihoming group when a link between the VTEP and the specified role fails, such that the other VTEP transmits the packet to the specified role.

14 Claims, 4 Drawing Sheets

(56) References Cited

U.S. PATENT DOCUMENTS

| | | | |
|---|---|---|---|
| 2015/0195178 A1 | 7/2015 | Bhattacharya et al. | |
| 2015/0358232 A1 | 12/2015 | Chen et al. | |
| 2016/0119156 A1 | 4/2016 | Drake et al. | |
| 2016/0285761 A1 | 9/2016 | Dong et al. | |
| 2019/0132241 A1* | 5/2019 | Vattem | H04L 12/4641 |
| 2020/0287780 A1* | 9/2020 | Singh | H04L 45/50 |

FOREIGN PATENT DOCUMENTS

| | | |
|---|---|---|
| CN | 104378296 A | 2/2015 |
| CN | 104378297 A | 2/2015 |
| CN | 104468394 A | 3/2015 |
| CN | 105553848 A | 5/2016 |
| CN | 105577417 A | 5/2016 |
| CN | 105791072 A | 7/2016 |
| CN | 106059932 A | 10/2016 |
| CN | 106789635 A | 5/2017 |
| JP | 2014187672 | 10/2014 |

OTHER PUBLICATIONS

State Intellectual Property Office of the People's Republic of China, Office Action and Search Report Issued in Application No. 201611033162.0, dated Apr. 25, 2019, 6 pages, (Submitted with Partial Translation).

ISA State Intellectual Property Office of the People's Republic of China, Written Opinion of the International Searching Authority Issued in Application No. PCT/CN2017/110883, dated Feb. 1, 2018, WIPO, 5 pages.

European Patent Office, Extended European Search Report Issued in Application No. 17872007.4, dated Oct. 7, 2019, Germany, 9 pages.

European Patent Office, Office Action Issued in Application No. 17872007.4, dated Mar. 10, 2021, Germany, 4 pages.

* cited by examiner

FORWARDING PACKET

CROSS REFERENCE TO RELATED APPLICATION

The present application is a National Phase of International Application Number PCT/CN2017/110883, filed Nov. 14, 2017, and claims priority to Chinese Patent Application No. 201611033162.0 entitled "METHOD AND DEVICE FOR FORWARDING PACKET" filed on Nov. 17, 2016, the entire content of which is incorporated herein by reference.

BACKGROUND

A multihoming network is described based on an Ethernet Virtual Private Network (EVPN) protocol. The multihoming means that a client may belong to more than two provider edge devices such as a Virtual eXtensible LAN (VXLAN) Tunnel End Point (VTEP).

BRIEF DESCRIPTION OF THE DRAWINGS

The accompanying drawings, which are incorporated in and constitute a part of the present description, illustrate examples consistent with the present disclosure and together with the description, serve to explain the principles of the present disclosure.

DETAILED DESCRIPTION OF THE EMBODIMENTS

The technical solutions of examples of the present disclosure will be described clearly and fully below in combination with drawings in the examples of the present disclosure. It is apparent that the described examples are merely a part of examples of the present disclosure rather than all examples. Other examples achieved by those of ordinary skill in the art based on the examples in the present disclosure without paying creative work shall all fall into the scope of protection of the present disclosure.

In a multihoming network, links for a client to access different VTEPs may use the same Ethernet Segment (ES) identifier. Each VTEP to which the client is homed will be configured with the above ES identifier and advertise the ES identifier to a remote VTEP. The remote VTEP associates the received ES identifier with the VTEP having transmitted the ES identifier. When receiving a route advertised by one of the above-mentioned VTEPs, the remote VTEP may determine the next hop of the route as each of the VTEPs associated with the above ES identifier and then share packets transmitted to the client among the VTEPs to which the client is homed in a load sharing manner. However, when a link between one of the VTEPs and the client is down (fails), the VTEP transmits an ES revoking message (carrying the ES identifier of the failed link) to the remote VTEP. After receiving the ES revoking message, the remote VTEP may find an route satisfying a condition from all routes associated with the ES identifier carried in the ES revoking message. Then the remote VTEP may update the next hop of the found MAC/IP route to another VTEP to which the client is homed. The satisfied condition is that the next hop of the MAC/IP route is the VTEP having transmitted the above-mentioned ES revoking message. When a link between a VTEP and the client is down, the remote VTEP will process both the ES revoking message and other received information, which will increase the load of the remote VTEP and lead to a lower network convergence rate.

In an example, in a multi-Board network deploying a plurality of Board gateways, each Board gateway may be considered as a VTEP. Since the concept of ES is not involved in a multi-Board network, the multihoming network mechanism as described above cannot be applied to the multi-Board network.

Figure 1:
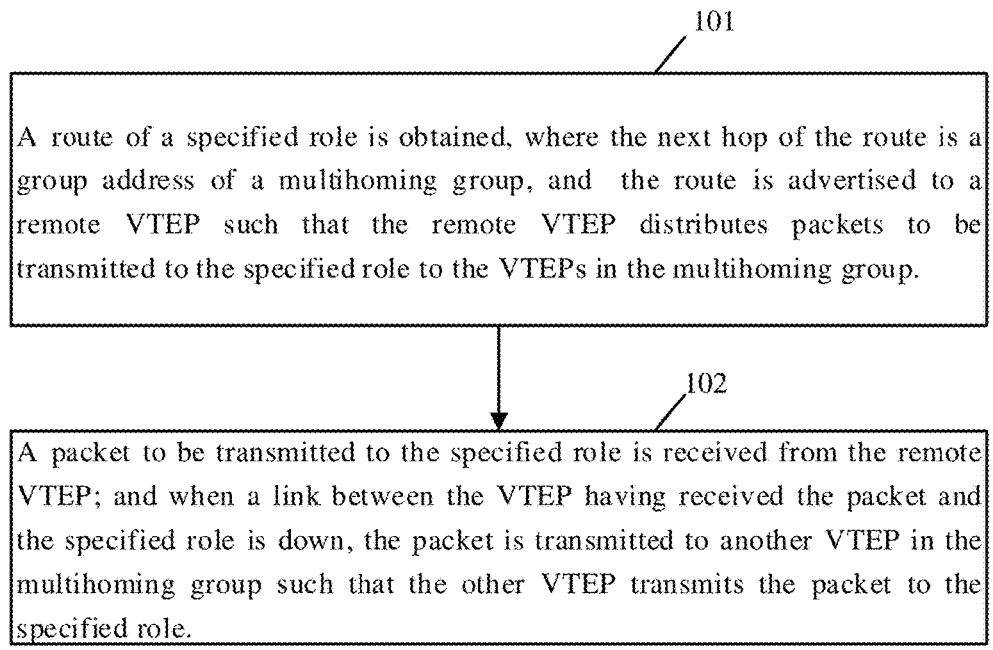
FIG. 1 is a flow diagram of a method according to an example of the present disclosure.

FIG. 1 is a flow diagram of a method according to an example of the present disclosure. The flow is applied to any VTEP in a multihoming group. The multihoming group may include all VTEPs to which a specified role is homed. The multihoming group is uniquely identified by a group address identifier; thus, different multihoming groups may have different group addresses.

As shown in FIG. 1, the flow may include the following blocks.

At block 101, a route of a specified role may be obtained, where the next hop of the route is a group address of a multihoming group, and the route is advertised to a remote VTEP such that the remote VTEP may distribute packets to be transmitted to the specified role to the VTEPs in the multihoming group.

In this block 101, the route may be advertised according to a routing protocol. When applied to an EVPN, the routing protocol may be the MP-BGP, and may also be the Intermediate System-to-Intermediate System (IS-IS) protocol, which is not specifically defined herein. As an example, the route may be a layer-2 route or a layer-3 route.

In the present disclosure, all VTEPs to which a specified role is homed may be set into a multihoming group in advance. Then, when the route of the specified role is learned by any VTEP to which the specified role is homed (how the VTEP learns the route will be described below), the VTEP may use the group address of the multihoming group as the next hop of the route and advertise the route to a remote VTEP. In this way, the remote VTEP will determine the next hop of the route as all VTEPs included in the multihoming group and then share the traffic to be transmitted to the specified role among the VTEPs included in the multihoming group in a load sharing manner, thereby realizing a link load sharing.

In an example of the present disclosure, in a multihoming network, the specified role may be a client.

In another example, in a multi-Board network, the VTEPs in the multihoming group are Board gateways, and the specified role is an external network connected with the Board gateways. The multi-Board network means that a plurality of Board gateways connected to an external network are deployed in an EVPN distributed gateway network. Traffic to be transmitted to the external network is load-shared among the plurality of Board gateways to which the external network is homed.

The difference between the multi-Board network and the multihoming network is that an ES identifier is used in the multihoming network while the concept of the ES is not involved in the multi-board network; therefore, the mechanism of the multihoming network is not applicable into the multi-Board network.

At block 102, a packet to be transmitted to the specified role may be received from the remote VTEP; and when a link between the VTEP having received the packet and the specified role is down, the packet may be transmitted to another VTEP in the multihoming group such that the other VTEP may transmit the packet to the specified role.

As can be seen from the flow shown in FIG. 1, in the present disclosure, all VTEPs to which a specified role is homed are set into a multihoming group. A VTEP in the multihoming group may advertise the group address of the multihoming group to a remote VTEP as the next hop of a route of the specified role while advertising the route to the remote VTEP. All the VTEPs to which the specified role is homed are no longer forced to advertise the common ES, which allows the technical solution of the present disclosure to be applied to not only a multihoming network but also a multi-Board network, thereby, expanding the application of the present disclosure.

In an example, when a link between a VTEP to which a specified role is homed and the specified role is down, the VTEP may not trigger a remote VTEP to process an ES revoking message, and the remote VTEP may still transmit a packet to be transmitted to the specified role to the VTEP. Even in a dual-homing network in which, for example, a client is dual-homed to a VTEP 1 and a VTEP 2, when the link between a VTEP such as the VTEP 1 and the client is down, the remote VTEP may still distribute packets to be transmitted to the client to both the VTEP 1 and the VTEP 2, rather than stop transmitting packets to the VTEP 1 because the link between the VTEP 1 and the client is down. Through the links between the remote VTEP and the two VTEPs to which the client is dual-homed, load sharing can be achieved.

In an example, when the link between a VTEP to which a specified role is homed and the specified role is down, the VTEP will transmit packets to another VTEP in the multihoming group such that the other VTEP forward the packets to the specified role. In this way, it is guaranteed that a fast network convergence can be achieved no matter whether the present disclosure is applied to a multihoming network or a multi-Board network.

A method provided in the present disclosure is to be described below with two examples.

VTEPs in a multihoming group to which a specified role is homed are usually independent of each other and have no mutual connections. Nevertheless, according to the method in the present disclosure, when the link between a VTEP to which the specified role is homed and the specified role is down, the VTEP may transmit packets to another VTEP in the multihoming group. In view of this, in an example, A Peer link may be established among the VTEPs to which the specified role is homed in a serial way. For example, a multihoming group includes 4 VTEPs, i.e., VTEP1, VTEP2, VTEP3 and VTEP4, a Peer link between the VTEP1 and the VTEP2, a Peer link between the VTEP2 and the VTEP3 and a Peer link between the VTPE3 and the VTEP4 may be established. However, it is just an example of establishing the peer links which is not limiting to the present disclosure. In this example, the peer links support all VLANs in a network.

Based on this, in this example, transmitting the packet to another VTEP in the multihoming group in the above block 102 includes: determining a VXLAN identifier (VNI) carried in the packet (e.g., carried in a VXLAN encapsulation), performing VXLAN de-capsulation on the packet, and carrying a VLAN identifier corresponding to the VNI in the de-capsulated packet and transmitting the de-capsulated packet via the Peer link already established.

This example is to be described below with the present disclosure applied to a dual-homing network (a particular case of the multihoming network).

Figure 2:
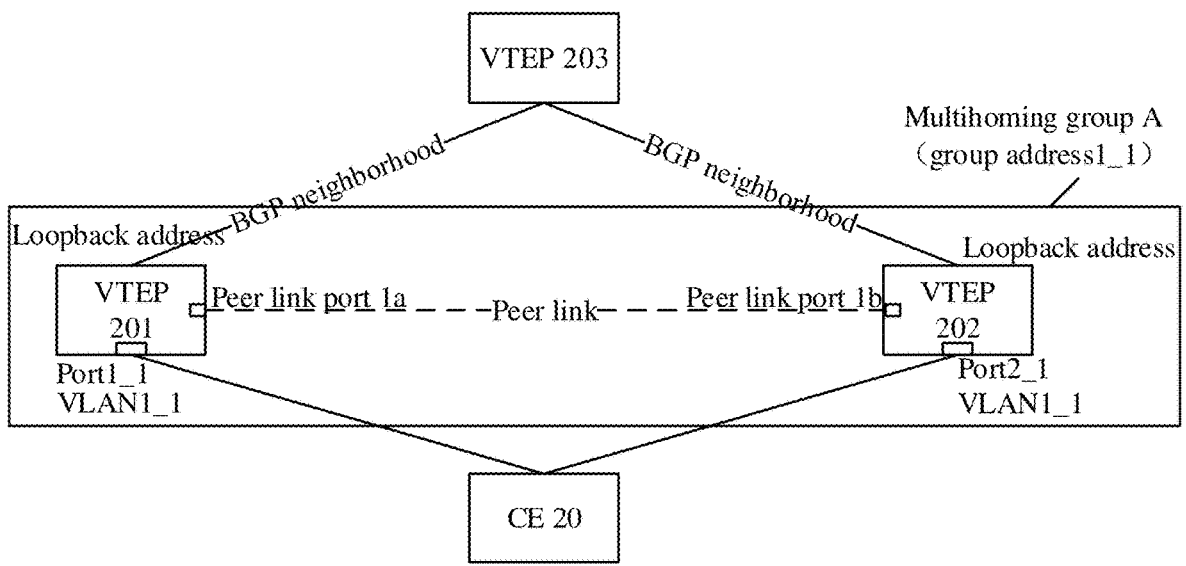
FIG. 2 is a schematic diagram of an application network according to an example of the present disclosure.

FIG. 2 is a schematic diagram of an application network according to an example of the present disclosure. In FIG. 2, the client is a Customer Edge (CE) device, denoted as CE 20. A VLAN that the CE 20 belongs to is denoted as VLAN1_1. The CE 20 is homed to a VTEP 201 and a VTEP 202. The VTEP 201 and the VTEP 202 both belong to a multihoming group A, and the group address of the multihoming group A is denoted as group address 1_1. A Peer link is established between the VTEP 201 and the VTEP 202.

The VTEP 201 and the VTEP 202 both establish a BGP neighborhood with a remote VTEP 203. For example, the VTEP 201 and the VTEP 202 may establish the BGP neighborhood with the remote VTEP 203 by using their respective Loopback interface addresses.

In FIG. 2, although the CE 20 is homed to the VTEP 201 and the VTEP 202, it is possible that only one of the VTEP 201 and the VTEP 202 learns a route of the CE 20 based on a packet transmitted by the CE 20 due to the link aggregation characteristic of different links from the CE 20 to the VTEP 201 and the VTEP 202. The CE 20 may transmit the packet to the VTEP 201 or the VTEP 202 in a HASH manner.

In an example in which the VTEP 201 learns the route of the CE 20 based on the packet transmitted by the CE 20, for convenience of description, the route of the CE 20 that is learned by the VTEP 201 is denoted as route 1_1 herein.

The VTEP 201 generates a route entry (denoted as route entry 1_1) corresponding to the route 1_1 and records it into a route table. The route entry 1_1 may include a destination address, a VNI, and an egress port. The destination address may be an MAC address or an IP address of the CE 20; the VNI may correspond to the VLAN to which the CE 20 belongs (i.e., the VLAN1_1) and denoted as VNI1_1; and the egress port is a port (Port1_1 as shown in FIG. 2 for example) on the VTEP 201 through which the packet transmitted by the CE 20 is received. Table 1 shows the route entry 1_1:

TABLE 1

| Destination address | VNI | Egress port |
|---|---|---|
| destination MAC address or destination IP address | VNI1_1 | Port1_1 |

The VTEP 201 may transmit a synchronous message carrying the route 1_1 and the next hop of the route 1_1 to the VTEP 202 in the multihoming group. The next hop of the route 1_1 is the group address 1_1. The synchronous message here may be a standard EVPN message.

The VTEP 201 may advertise the route 1_1 to the remote VTEP 203, where the next hop of the advertised route 1_1 is the group address 1_1.

After receiving the synchronous message transmitted by the VTEP 201, the VTEP 202 may learn the route 1_1 from the synchronous message, generate a route entry (denoted as a route entry 2_1) corresponding to the route 1_1 and record it into a route table. The route entry 2_1 may include a destination address, a VNI, and an egress port. The destination address may be the MAC address or the IP address of the CE 20; the VNI may be the VNI (i.e., the above-mentioned VNI1_1) corresponding to the VLAN identifier VLAN1_1 carried in the synchronous message; and the egress port is a port (Port2_1 as shown in FIG. 2 for example) on the VTEP 202 that corresponds to the VLAN identifier VLAN1_1 carried in the synchronous message. Table 2 shows the route entry 2_1:

TABLE 2

| Destination address | VNI | Egress port |
| --- | --- | --- |
| destination MAC address or destination IP address | VNI1_1 | Port2_1 |

The VTEP 202 may advertise the route 1_1 to the remote VTEP 203, where the next hop of the advertised route 1_1 is the group address 1_1.

When receiving the routes 1_1 advertised by the VTEP 201 and the VTEP 202 respectively, the VTEP 203 may identify that the next hops of the routes 1_1 advertised by the VTEP 201 and the VTEP 202 are both the group address of the multihoming group A. Therefore, the VTEP 203 may determine that the next hop of the route 1_1 is the group address of the multihoming group A.

When receiving packets to be transmitted to the CE 20, the VTEP 203 will determine to transmit the packets to either the VTEP 201 or the VTEP 202 of the multihoming group A in the load sharing manner.

When a packet is transmitted by the VTEP 203 to the VTEP 201, if the link between the VTEP 201 and the CE 20 is normal, the VTEP 201 may determine the VNI in the VXLAN encapsulation of the packet, perform VXLAN de-capsulation on the packet, search a route table for a corresponding route entry, i.e., the above-mentioned route entry 1_1, based on the VNI and the destination address of the packet, and transmit the VXLAN-de-capsulated packet to the CE 20 via the egress port of the obtained route entry 1_1, i.e., the Port1_1.

When a packet is transmitted by the VTEP 203 to the VTEP 202, if the link between the VTEP 202 and the CE 20 is normal, the VTEP 202 may determine the VNI in the VXLAN encapsulation of the packet, perform VXLAN de-capsulation on the packet, search a route table for a corresponding route entry, i.e., the above-mentioned route entry 2_1, based on the VNI and the destination address of the packet, and transmit the VXLAN-de-capsulated packet to the CE 20 via the egress port of the obtained route entry 2_1, i.e., the Port2_1.

When the link between one of the VTEP 201 and the VTEP 202, and the CE 20 is down, for example, the link between the VTEP 201 and the CE 20 is down, the VTEP 201 may first find a matching route entry, i.e., the above-mentioned route entry 1_1 in the route table and modify the egress port Port1_1 to a Peer link port 1a on the VTEP 201 that is connected with the VTEP 202.

Then, when a packet is transmitted by the VTEP 203 to the VTEP 201, the VTEP 201 may determine the corresponding route entry, i.e., the above-mentioned route entry 1_1, in the route table based on the VLAN identifier corresponding to the VNI in the VXLAN encapsulation of the packet and the destination address of the packet. The VTEP 201 may identify that the egress port of the route entry 1_1 is the Peer link port 1a. Then the VTEP 201 may transmit the packet (which has been VXLAN de-capsulated) with the VLAN identifier corresponding to the VNI via the Peer link already established.

When the VTEP 202 receives the packet from the Peer link port 1b via the Peer link already established with the VTEP 201, the VTEP 202 may determine the VNI according to the VLAN identifier carried in the packet, determine the corresponding route entry, i.e., the above-mentioned route entry 2_1, in the route table based on the VNI and the destination address of the packet, and transmit the packet to the CE 20 via the egress port of the route entry 2_1, i.e., the Port2_1.

This example is described above by taking a multihoming network for example.

As can be seen from the above description, even if the link between the VTEP 201 and the CE 20 is down, it is not affected that the remote VTEP 203 distributes packets to be transmitted to the CE 20 to the VTEP 201 and the VTEP 202 in a load sharing manner Thus, it is realized that a VTEP connected by a failed link in a multihoming network is still involved in load sharing, significantly improving network link usage.

It needs to be noted that when the link between the VTEP 201 and the CE 20 is down, the VTEP 201 does not transmit an ES revoking message to the remote VTEP 203 and the remote VTEP 203 does not need to process an ES revoking message; therefore, the network convergence rate is significantly increased.

When the link between the VTEP 201 and the CE 20 is down, only the route entry on the VTEP 201 is to be modified, further increasing the network convergence rate.

This example is to be further described below by taking a dual-Board network for example.

Figure 3:
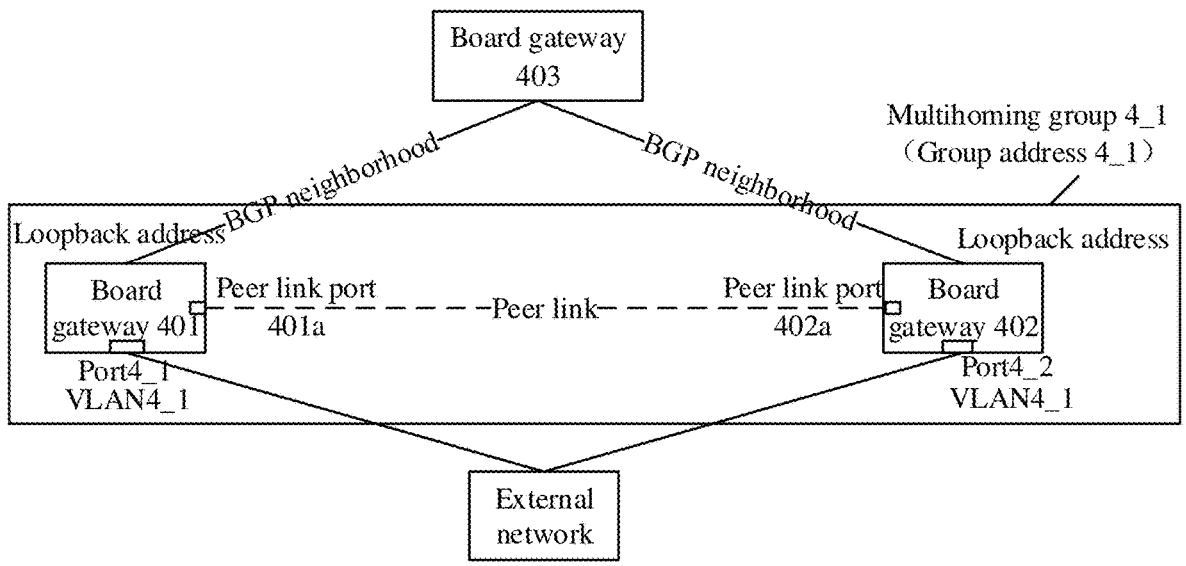
FIG. 3 is a schematic diagram of an application network according to another example of the present disclosure.

FIG. 3 is a schematic diagram of an application network according to another example of the present disclosure. In FIG. 3, an external network is homed to a Board gateway 401 and a Board gateway 402. The Board gateway 401 and the Board gateway 402 both belong to a multihoming group 4_1, and the group address of the multihoming group 4_1 is denoted as group address 4_1. A Peer link is established between the Board gateway 401 and the Board gateway 402.

The Board gateway 401 and the Board gateway 402 both establish a BGP neighborhood with the remote Board gateway 403. The Board gateway 401 and the Board gateway 402 may establish the BGP neighborhood with the remote Board gateway 403 by using their respective Loopback addresses.

In FIG. 3, the Board gateway 401 and the Board gateway 402 are both configured with default routes. For convenience of description, the default route entry configured for the Board gateway 401 is denoted as default route entry 4_0, and the default route entry configured for the Board gateway 402 is denoted as default route entry 0_4.

The default route entry 4_0 is used for the Board gateway 401 to transmit a packet to the Board gateway 402 via a Peer link with the Board gateway 402 when a link between the Board gateway 401 and the external network is down. The default route entry 4_0 includes a destination address, a VNI, and an egress port. The destination address may be an MAC address or an IP address of a client in the external network; the VNI may correspond to the VLAN to which the external network belongs and denoted as VNI4_1; and the egress port is a Peer link port 401a. Table 3 shows the default route entry 4_0:

TABLE 3

| Destination address | VNI | Egress port |
|---|---|---|
| destination MAC address or destination IP address | VNI4_1 | Peer link port 401a |

The default route entry 0_4 is used for the Board gateway 402 to transmit a packet to the Board gateway 401 via the Peer link with the Board gateway 401 when the link between the Board gateway 402 and the external network is down. The default route entry 0_4 includes a destination address, a VNI, and an egress port, where the destination address may be the MAC address or the IP address of the client in the external network; the VNI may correspond to the VLAN to which the external network belongs and denoted as VNI4_1; and the egress port is a Peer link port 402a. Table 4 shows the default route entry 0_4:

TABLE 4

| Destination address | VNI | Egress port |
|---|---|---|
| destination MAC address or destination IP address | VNI4_1 | Peer link port 402a |

In FIG. 3, the Board gateway 401 and the Board gateway 402 both establish connections with the external network based on a route protocol, and therefore, both of the Board gateway 401 and the Board gateway 402 will learn a route of the external network. Therefore, it is not necessary for a Board gateway in a multihoming group to transmit the learned route to other Board gateways in the multihoming group through a synchronous message as done in the multihoming network.

The Board gateway 401 may generate a corresponding route entry (denoted as route entry 4_1) when learning the route of the external network, and record it into a route table. The route entry 4_1 includes a destination address, a VNI, and an egress port. The destination address may be the MAC address or the IP address of the client in the external network; the VNI may correspond to the VLAN to which the external network belongs and denoted as VNI4_1; and the egress port is a routing interface (Port4_1 as shown in FIG. 3 for example) via which the Board gateway 401 accesses the external network. Table 5 shows the route entry 4_1:

TABLE 5

| Destination address | VNI | Egress port |
|---|---|---|
| destination MAC address or destination IP address | VNI4_1 | Port4_1 |

The Board gateway 401 may advertise the learned route of the external network to the remote Board gateway 403, where the next hop of the advertised route is the group address 4_1.

Figure 5:
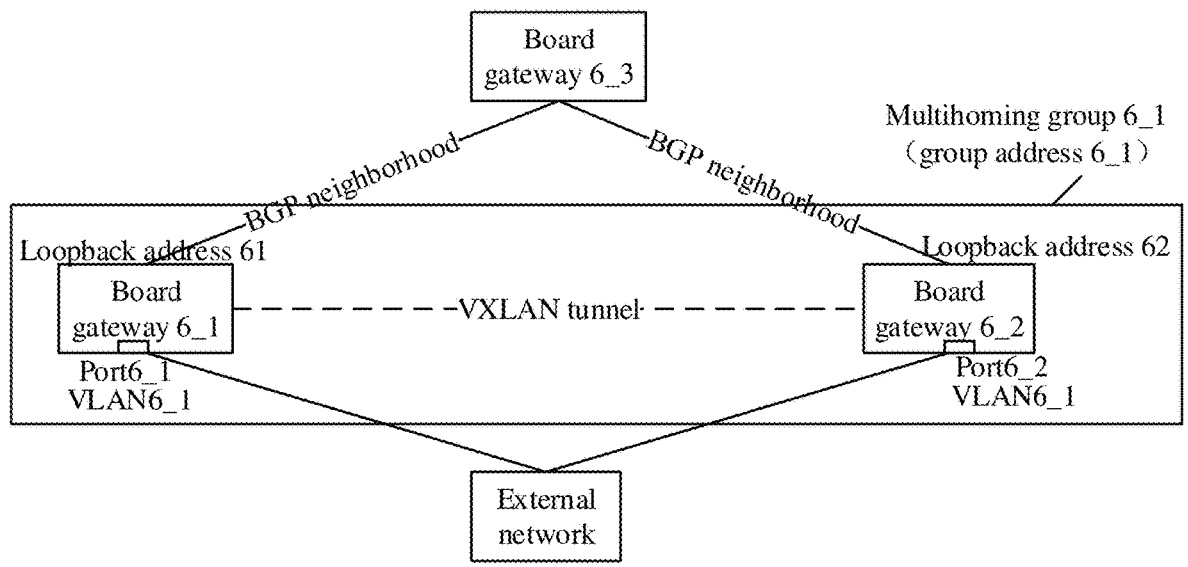
FIG. 5 is a schematic diagram of an application network according to still another example of the present disclosure.

The Board gateway 402 may generate a corresponding route entry (denoted as route entry 4_2) when learning the route of the external network, and record it into the route table. The route entry 4_2 includes a destination address, a VNI, and an egress port. The destination address may be the MAC address or the IP address of the client in the external network; the VNI may correspond to the VLAN to which the external network belongs and denoted as VNI4_1; and the egress port is a rout interface (Port4_2 as shown in FIG. 5 for example) via which the Board gateway 402 accesses the external network. Table 6 shows the route entry 4_2:

TABLE 6

| Destination address | VNI | Egress port |
|---|---|---|
| destination MAC address or destination IP address | VNI4_1 | Port4_2 |

The Board gateway 402 may advertise the learned route of the external network to the remote Board gateway 403, where the next hop of the advertised route is the group address 4_1.

When receiving the routes of the external network advertised by the Board gateway 401 and the Board gateway 402, the Board gateway 403 may identify that the next hops of the routes advertised by the Board gateway 401 and the Board gateway 402 both are the group address 4_1 of the multihoming group 4_1. Therefore the Board gateway 403 may determine that the next hop of the route is the group address 4_1 of the multihoming group 4_1.

When receiving packets to be transmitted to the external network, the Board gateway 403 will determine to transmit the packets to either the Board gateway 401 or the Board gateway 402 of the multihoming group 4_1 in a load sharing manner.

When a packet is transmitted by the Board gateway 403 to the Board gateway 401, if the link between the Board gateway 401 and the external network is normal, the Board gateway 401 may determine the VNI in the VXLAN encapsulation of the packet, perform VXLAN de-capsulation on the packet, search a route table for a corresponding route entry, i.e., the above-mentioned route entry 4_1, based on the VNI and the destination address of the packet, and transmit the VXLAN-de-capsulated packet to the external network via the egress port of the obtained route entry 4_1, i.e., the Port4_1.

When a packet is transmitted by the Board gateway 403 to the Board gateway 402, if the link between the Board gateway 402 and the external network is normal, the Board gateway 402 may determine the VNI in the VXLAN encapsulation of the packet, perform VXLAN de-capsulation on the packet, search a route table for a corresponding route entry, i.e., the above-mentioned route entry 4_2, based on the VNI and the destination address of the packet, and transmit the VXLAN-de-capsulated packet to the external network via the egress port of the obtained route entry 4_2, i.e., the Port4_2.

When the link between one of the Board gateway 401 and the Board gateway 402, and the external network is down, for example, the link between the Board gateway 401 and the external network is down, the Board gateway 401 may find and delete the above-mentioned route entry 4_1 in the route table.

Then, when a packet is transmitted by the Board gateway 403 to the Board gateway 401, the Board gateway 401 may determine a corresponding route entry, i.e., the above-mentioned default route entry 4_0, in the route table based on the VNI in the VXLAN encapsulation of the packet and the destination address of the packet. The Board gateway 401 may identify that the egress port of the route entry 4_0 is the Peer link port 401a. Then the Board gateway 401 may transmit the packet (which has been VXLAN de-capsulated) carrying the VLAN identifier corresponding to the VNI via the Peer link already established.

When receiving the packet via the Peer link already established with the Board gateway 401, the Board gateway 402 may determine the VNI based on the VLAN identifier carried in the packet, determine a corresponding route entry, i.e., the above-mentioned route entry 4_2, in the route table based on the VNI and the destination address of the packet and transmit the packet to the external network via the egress port of the route entry 4_2, i.e., the Port4_2.

The above description for the example is made by taking a multi-Board network for example.

To enable a VTEP to transmit a packet to another VTEP in a multihoming group when a link between the VTEP to which a specified role is homed and the specified role is down, in the above example, a Peer link may be established among VTEPs in the multihoming group in a serial way. Nevertheless, in another example, a VXLAN tunnel may be established among the VTEPs to which the specified role is homed in a serial way.

Based on this, in an example, transmitting the packet to another VTEP in the multihoming group in the above block 102 includes: modifying an outer layer IP header (e.g., IP header in a VXLAN encapsulation) of the packet and transmitting the packet via the VXLAN tunnel already established, where modifying the IP header includes: modifying a source IP address in the IP header to a Loopback address of the present VTEP and modifying a destination IP address in the IP header to a Loopback address of another VTEP in the multihoming group that establishes the VXLAN tunnel with the present VTEP.

This example is to be described below by an example of a dual-homing network applied in the present disclosure.

Figure 4:
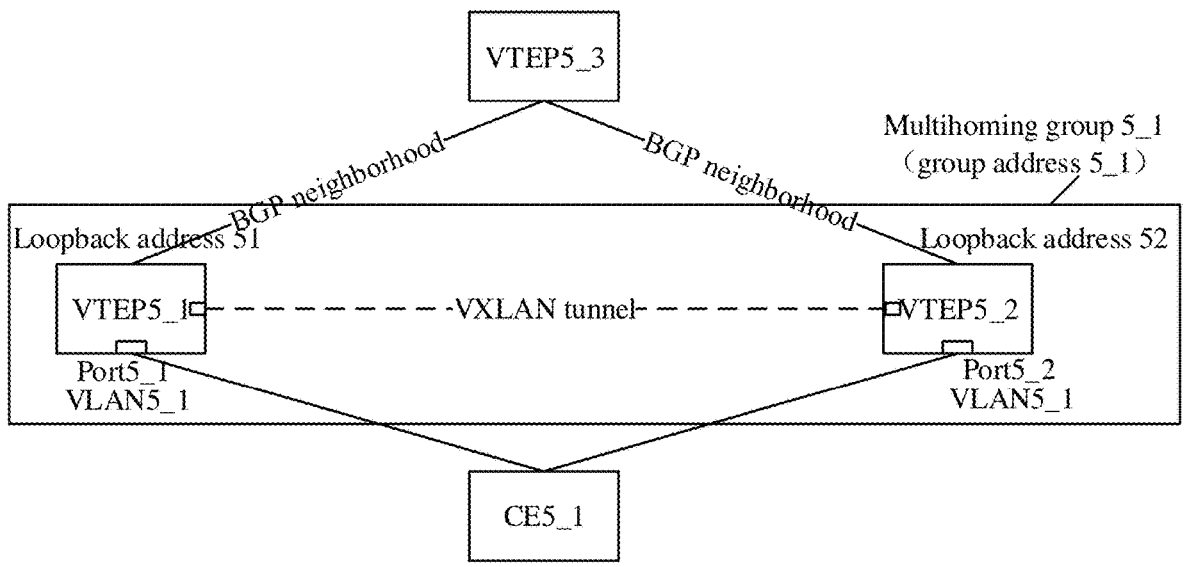
FIG. 4 is a schematic diagram of an application network according to yet another example of the present disclosure.

FIG. 4 is a schematic diagram of an application network according to an example of the present disclosure. In FIG. 4, the client is CE5_1. A VLAN to which the CE5_1 belongs is denoted as VLAN5_1. The CE5_1 is homed to VTEP5_1 and VTEP5_2. The VTEP5_1 and the VTEP5_2 both belong to a multihoming group 5_1, and the group address of the multihoming group 5_1 is denoted as group address 5_1. A VXLAN tunnel is established between the VTEP5_1 and the VTEP5_2.

The VTEP5_1 and the VTEP5_2 both establish a BGP neighborhood with a remote VTEP5_3, where the VTEP5_1 and the VTEP5_2 both establish the BGP neighborhood with the remote VTEP5_3 by using their respective Loopback addresses (loopback address 51 and Loopback address 52).

In FIG. 4, although the CE5_1 is homed to the VTEP5_1 and the VTEP5_2, it is possible that only one of the VTEP5_1 and the VTEP5_2 may learn a route of the CE5_1 based on a packet transmitted by the CE5_1. The CE5_1 may transmit the packet to the VTEP5_1 or the VTEP5_2 in the HASH manner.

For example, the VTEP5_1 learns the route of the CE5_1 based on the packet transmitted by the CE5_1, and for convenience of description, the route of the CE5_1 learned by the VTEP5_1 is denoted as route 5_1 herein.

The VTEP5_1 generates a route entry (denoted as route entry 5_1) corresponding to the route 5_1 and records it into a route table. The route entry 5_1 includes a destination address, a VNI, and an egress port. The destination address may be an MAC address or an IP address of the CE5_1; the VNI may correspond to the VLAN to which the CE5_1 belongs (i.e., VLAN5_1) and denoted as VNI5_1; and the egress port is a port (Port5_1 as shown in FIG. 4 for example) on the VTEP 5_1 that receives the packet transmitted by the CE5_1. Table 7 shows the route entry 5_1:

TABLE 7

| Destination address | VNI | Egress port |
|---|---|---|
| destination MAC address or destination IP address | VNI5_1 | Port5_1 |

The VTEP5_1 may transmit a synchronous message to the VTEP5_2 in the multihoming group, where the synchronous message carries the route 5_1 and the next hop of the route 5_1, and the next hop of the route 5_1 is the group address 5_1.

The VTEP5_1 may advertise the route 5_1 to the remote VTEP5_3. Here, the next hop of the advertised route 5_1 is the group address 5_1.

After receiving the synchronous message from the VTEP5_1, the VTEP5_2 may learn the route 5_1 from the synchronous message, generate a route entry (denoted as a route entry 5_2) corresponding to the route 5_1 and record it into a route table. The route entry 5_2 includes a destination address, a VNI, and an egress port. The destination address may be the MAC address or the IP address of the CE5_1; the VNI may be a VNI (i.e., the above-mentioned VNI5_1) corresponding to the VLAN identifier VLAN5_1 carried in the synchronous message; and the egress port is a port (Port5_2 as shown in FIG. 4 for example) on the VTEP5_2 that corresponds to the VLAN identifier VLAN5_1 carried in the synchronous message. Table 8 shows the route entry 5_2:

TABLE 8

| Destination address | VNI | Egress port |
|---|---|---|
| destination MAC address or destination IP address | VNI5_1 | Port5_2 |

The VTEP5_2 may advertise the route 5_1 to the remote VTEP5_3. Here, the next hop of the advertised route 5_1 is the group address 5_1.

When receiving the routes 5_1 advertised by the VTEP5_1 and the VTEP5_2 respectively, the VTEP5_3 may identify that the next hops of the routes 5_1 advertised by the VTEP5_1 and the VTEP5_2 both are the group address 5_1 of the multihoming group 5_1 and then determine that the next hop of the route 5_1 is the group address 5_1 of the multihoming group 5_1 (including the VTEP5_1 and the VTEP5_2).

When receiving packets to be transmitted to the CE5_1, the VTEP5_3 will determine to transmit the packets to either the VTEP5_1 or the VTEP5_2 of the multihoming group 5_1 in the load sharing manner.

When a packet is transmitted by the VTEP5_3 to the VTEP5_1, if the link between the VTEP5_1 and the CE5_1 is normal, the VTEP5_1 may determine the VNI in the VXLAN encapsulation of the packet, search a route table for a corresponding route entry, i.e., the above-mentioned route entry 5_1, based on the VNI and the destination address of the packet, and transmit the packet (which has been VXLAN de-capsulated) to the CE5_1 via the egress port of the obtained route entry 5_1, i.e., the Port5_1.

When a packet is transmitted by the VTEP5_3 to the VTEP5_2, if the link between the VTEP5_2 and the CE5_1 is normal, the VTEP5_2 may determine the VNI in the VXLAN encapsulation of the packet, search a route table for a corresponding route entry, i.e., the above-mentioned route entry 5_2, based on the VNI and the destination address of the packet, and transmit the packet (which has been VXLAN de-capsulated) to the CE5_1 via the egress port of the obtained route entry 5_2, i.e., the Port5_2.

When the link between one of the VTEP5_1 and the VTEP5_2, and the CE5_1 is down, for example, the link between the VTEP5_1 and the CE5_1 is down, the VTEP5_1 may first obtain a corresponding route entry, i.e., the above-mentioned route entry 5_1 in the route table and modify the egress port Port5_1 of the obtained route entry 5_1 to the Loopback address 52 of the VTEP5_2.

Then, when a packet is transmitted by the VTEP5_3 to the VTEP5_1, the VTEP5_1 may determine a corresponding route entry, i.e., the above-mentioned route entry 5_2, in the route table based on the VNI in the VXLAN encapsulation of the packet and the destination address of the packet. The VTEP5_1 may identify that the egress port of the route entry 5_2 is the Loopback address 52 of the VTEP 5_2, modify an IP header in the VXLAN encapsulation of the packet, and then transmit the packet via the VXLAN tunnel already established between the VTEP5_1 and the VTEP5_2. Modifying the IP header includes: modifying a source IP address in the IP header to the Loopback address 51 of the VTEP5_1 and modifying a destination IP address in the IP header to the egress port of the route entry 5_2, i.e., the Loopback address 52 of the VTEP5_2.

When receiving the packet via the VXLAN tunnel already established with the VTEP5_1, the VTEP5_2 may determine the VNI carried in the VXLAN encapsulation of the packet, determine a route entry, i.e., the above-mentioned route entry 5_2, in the route table based on the VNI and the destination address of the packet and transmit the packet (which has been VXLAN de-capsulated) to the CE5_1 via the egress port of the route entry 5_2, i.e., the Port5_2.

This example is described above by taking a multihoming network for example.

This example is to be further described below by an example of a multi-Board network.

FIG. 5 is a schematic diagram of an application network according to another example of the present disclosure. In FIG. 5, an external network is homed to a Board gateway 6_1 and a Board gateway 6_2. The Board gateway 6_1 and the Board gateway 6_2 both belong to a multihoming group 6_1, and the group address of the multihoming group 6_1 is denoted as group address 6_1. A VXLAN tunnel is established between the Board gateway 6_1 and the Board gateway 6_2.

The Board gateway 6_1 and the Board gateway 6_2 both establish a BGP neighborhood with a remote Board gateway 6_3, where the Board gateway 6_1 and the Board gateway 6_2 both establish the BGP neighborhood with the remote Board gateway 6_3 by using their respective Loopback addresses (Loopback address 61 and Loopback address 62).

In FIG. 5, the Board gateway 6_1 and the Board gateway 6_2 are both configured with default routes. For convenience of description, the default route entry configured for the Board gateway 6_1 is denoted as default route entry 6_0, and the default route entry configured for the Board gateway 6_2 is denoted as default route entry 0_6.

The default route entry 6_0 is used for the Board gateway 6_1 to transmit a packet to the Board gateway 6_2 via the VXLAN tunnel established with the Board gateway 6_2 when the link between the Board gateway 6_1 and an external network is down. The default route entry 6_0 includes a destination address, a VNI, and an egress port. The destination address may be an MAC address or an IP address of a client in the external network; the VNI may correspond to the VLAN to which the external network belongs and denoted as VNI6_1; and the egress port is the Loopback address 62 of the Board gateway 6_2. Table 9 shows the default route entry 6_0:

TABLE 9

| Destination address | VNI | Egress port |
| --- | --- | --- |
| destination MAC address or destination IP address | VNI6_1 | loopback address 62 of Board gateway6_2 |

The default route entry 0_6 is used for the Board gateway 6_2 to transmit a packet to the Board gateway 6_1 via the VXLAN tunnel established with the Board gateway 6_1 when the link between the Board gateway 6_2 and the external network is down. The default route entry 0_6 includes a destination address, a VNI, and an egress port. The destination address may be the MAC address or the IP address of the client in the external network; the VNI may correspond to the VLAN to which the external network belongs and denoted as VNI6_1; and the egress port is the Loopback address 61 of the Board gateway 6_1. Table 10 shows the default route entry 0_6:

TABLE 10

| Destination address | VNI | Egress port |
| --- | --- | --- |
| destination MAC address or destination IP address | VNI6_1 | loopback address 61 of Board gateway6_1 |

In FIG. 5, the Board gateway 6_1 and the Board gateway 6_2 both establish a routing protocol with the external network, and therefore, both of the Board gateway 6_1 and the Board gateway 6_2 will directly learn a route of the external network. Therefore, it is not necessary for a Board gateway in a multihoming group to transmit the learned route to other Board gateways in the multihoming group through a synchronous message as done in the multihoming network.

The Board gateway 6_1 may generate a corresponding route entry (denoted as route entry 6_1) when learning the route of the external network, and record it into a route table. The route entry 6_1 includes a destination address, a VNI, and an egress port. The destination address may be the MAC address or the IP address of the client in the external network; the VNI may correspond to the VLAN to which the external network belongs and denoted as VNI6_1; and the egress port is a rout interface (Port6_1 as shown in FIG. 5 for example) via which the Board gateway 6_1 accesses the external network. Table 11 shows the route entry 6_1:

TABLE 11

| Destination address | VNI | Egress port |
| --- | --- | --- |
| destination MAC address or destination IP address | VNI6_1 | Port6_1 |

The Board gateway 6_1 may advertise the learned route of the external network to the remote Board gateway 6_3. Here, the next hop of the advertised route is the group address 6_1.

The Board gateway 6_2 may generate a corresponding route entry (denoted as route entry6_2) when learning the route of the external network, and record it into a route table. The route entry 6_2 includes a destination address, a VNI, and an egress port. The destination address may be the MAC address or the IP address of the client in the external network; the VNI may correspond to the VLAN to which the external network belongs and denoted as VNI6_1; and the egress port is a rout interface (Port6_2 as shown in FIG. 5 for example) via which the Board gateway 6_2 accesses the external network. Table 12 shows the route entry6_2:

TABLE 12

| Destination address | VNI | Egress port |
|---|---|---|
| destination MAC address or destination IP address | VNI6_1 | Port6_2 |

The Board gateway 6_2 may advertise the learned route of the external network to the remote Board gateway 6_3. Here, the next hop of the advertised route is the group address 6_1.

When receiving the routes of the external network advertised by the Board gateway 6_1 and the Board gateway 6_2 respectively, the Board gateway 6_3 may identify that the next hops of the routes advertised by the Board gateway 6_1 and the Board gateway 6_2 are the group address 6_1 of the multihoming group 6_1 and then determine that the next hop of the route is the group address 6_1 of the multihoming group 6_1.

When receiving packets to be transmitted to the external network, the Board gateway 6_3 will determine to transmit the packets to either the Board gateway 6_1 or the Board gateway 6_2 of the multihoming group 6_1 in the load sharing manner.

When a packet is transmitted by the Board gateway 6_3 to the Board gateway 6_1, if the link between the Board gateway 6_1 and the external network is normal, the Board gateway 6_1 may determine the VNI in the VXLAN encapsulation of the packet, search a route table for a corresponding route entry, i.e., the above-mentioned route entry 6_1, based on the VNI and the destination address of the packet, and transmits the packet (which has been VXLAN de-capsulated) to the external network via the egress port of the obtained route entry 6_1, i.e., the Port6_1.

When a packet is transmitted by the Board gateway 6_3 to the Board gateway 6_2, if the link between the Board gateway 6_2 and the external network is normal, the Board gateway 6_2 may determine the VNI in the VXLAN encapsulation of the packet, search a route table for a corresponding route entry, i.e., the above-mentioned route entry 6_2, based on the VNI and the destination address of the packet, and transmit the packet (which has been VXLAN-decapsulated) to the external network via the egress port of the obtained route entry 6_2, i.e., the Port6_2.

When the link between one of the Board gateway 6_1 and the Board gateway 6_2, and the external network is down, for example, the link between the Board gateway 6_1 and the external network is down, the Board gateway 6_1 may find and delete the above-mentioned route entry 6_1 in the route table.

Then, when a packet is transmitted by the Board gateway 6_3 to the Board gateway 6_1, the Board gateway 6_1 may determine a corresponding route entry, i.e., the above-mentioned default route entry 6_0, in the route table based on the VNI in the VXLAN encapsulation of the packet and the destination address of the packet. The Board gateway 6_1 may modify an IP header in the VXLAN encapsulation of the packet according to the default route entry 6_0 and transmit the packet via the VXLAN tunnel already established between the Board gateway 6_1 and the Board gateway 6_2. Modifying the IP header in the VXLAN encapsulation of the packet includes: modifying a source IP address in the IP header to the Loopback address 61 of the VTEP6_1 and modifying a destination IP address in the IP header to the egress port of the default route entry 6_0, i.e., the Loopback address 62 of the VTEP6_2.

When receiving the packet via the VXLAN tunnel already established with the Board gateway 6_1, the Board gateway 6_2 may determine the VNI in the VXLAN encapsulation of the packet, determine a route entry, i.e., the above-mentioned route entry 6_2, in the route table based on the determined VNI and the destination address of the packet and transmit the packet (which has been VXLAN de-capsulated) to the external network via the egress port of the route entry 6_2, i.e., the Port6_2.

The foregoing are descriptions of the method provided in the present disclosure. A device provided in the present disclosure will be described below.

Figure 6:
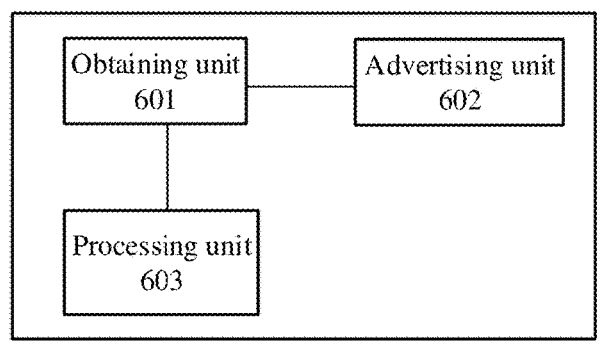
FIG. 6 is a structure diagram of a device according to an example of the present disclosure.

FIG. 6 is a structure diagram of a device according to an example of the present disclosure.

The device is applied to any VTEP in a multihoming group, and the multihoming group includes all VTEPs that a specified role is homed to. As shown in FIG. 6, the device includes:

an obtaining unit 601 configured to obtain a route of the specified role, where the multihoming group includes all VTEPs that the specified role is homed to;

an advertising unit 602 configured to advertise the route to a remote VTEP such that the remote VTEP distributes packets to be transmitted to the specified role among VTEPs in the multihoming group according to the route, where the next hop of the route advertised to the remote VTEP is a group address of the multihoming group; and a processing unit 603 configured to receive the packet to be transmitted to the specified role from the remote VTEP, and transmit the packet to another VTEP in the multihoming group when a link between the VTEP and the specified role fails, such that the other VTEP transmits the packet to the specified role.

In an example, a Peer link is established between the VTEPs in the multihoming group in a serial way.

The processing unit 603 transmits the packet to the other VTEP in the multihoming group, which specifically includes:

determining a VXLAN identifier VNI carried in the packet;

obtaining a de-capsulated packet by performing VXLAN de-capsulation on the packet, and transmitting the de-capsulated packet carrying a VLAN identifier corresponding to the VNI via the established Peer link.

In an example, the specified role is a client. When the link between the VTEP and the specified role fails, the processing unit 703 further determines, in a route table, a route entry satisfying a condition: an egress port of the route entry is a port on the VTEP that is connected with the failed link, and modifies the egress port in the route entry to a Peer link port on the VTEP.

The processing unit 603 transmits the de-capsulated packet carrying the VLAN identifier corresponding to the VNI via the established Peer link, which specifically includes: determining a route entry in the route table based on the VNI and a destination address of the packet, and transmitting the de-capsulated packet carrying the VLAN identifier corresponding to the VNI via the egress port in the route entry, the egress port being a Peer link port.

In an example, the VTEP is a Board gateway. When the link between the VTEP and the specified role fails, the processing unit 603 further obtains and deletes a route entry satisfying a condition in the route table, where the condition is that: an egress port of the route entry is a port on the VTEP that is connected with the failed link.

The processing unit 603 transmits the de-capsulated packet carrying the VLAN identifier corresponding to the VNI via the established Peer link, which specifically includes: determining a set first default route in the route table based on the VNI and the destination address of the packet and transmitting the de-capsulated packet carrying the VLAN identifier corresponding to the VNI via the egress port of the first default route, where the egress port of the first default route is a Peer link port.

In an example, a VXLAN tunnel is established between the VTEPs in the multihoming group in a serial way. The processing unit 603 transmits the packet to the other VTEP in the multihoming group, which specifically includes: transmitting the packet via the established VXLAN tunnel after modifying an outer layer IP header of the packet, where modifying the outer layer IP header of the packet includes: modifying a source IP address in the outer layer IP header to a Loopback address of the VTEP and modifying a destination IP address of the outer layer IP header to a Loopback address of other VTEP in the multihoming group that establishes the VXLAN tunnel with the VTEP.

In an example, when the link between the VTEP and the specified role fails, the processing unit 603 further determines, in the route table, a route entry satisfying the following condition: an egress port of the route entry is a port on the VTEP that is connected with the failed link, and modifies the egress port in the route entry to a Loopback address of another VTEP in the multihoming group that establishes the VXLAN tunnel with the VTEP;

The processing unit 603 transmits the packet via the established VXLAN tunnel after modifying the outer layer IP header of the packet, which specifically includes: determining a route entry in the route table based on the VNI carried in the packet and the destination address of the packet, and when the egress port of the route entry is a Loopback address, modifying the source IP address of the outer layer IP header of the packet to the Loopback address of the VTEP and modifying the destination IP address of the outer layer IP header to the egress port, and transmitting the packet to the egress port.

In an example, the VTEP is a Board gateway. When the link between the VTEP and the specified role fails, the processing unit 603 further determines and deletes a route entry satisfying a condition in the route table, where the condition is that: an egress port of the route entry is a port on the VTEP that is connected with the failed link.

The processing unit 603 transmits the packet via the established VXLAN tunnel after modifying the outer layer IP header of the packet, which specifically includes: determining a set second default route in the route table based on the VNI carried in the packet and the destination address of the packet, modifying the source IP address of the outer layer IP header of the packet to the Loopback address of the VTEP and modifying the destination IP address of the outer layer IP header to the egress port of the second default route and transmitting the packet to the egress port of the second default route, where the egress port of the second default route is the Loopback address of other VTEP in the multihoming group that establishes the VXLAN tunnel with the VTEP.

Figure 7:
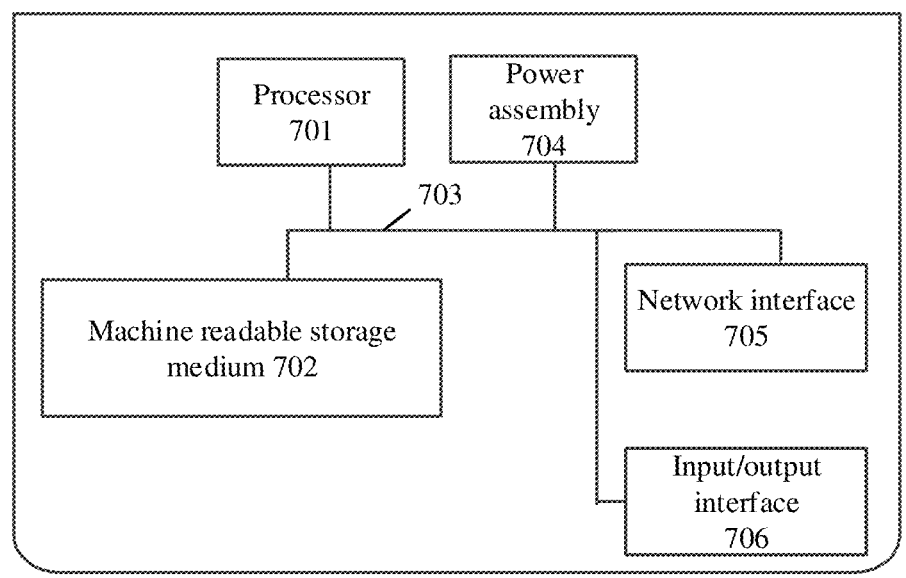
FIG. 7 is a hardware structure diagram of a device according to an example of the present disclosure.

FIG. 7 is a schematic structure diagram of a VTEP according to an example of the present disclosure. The device includes: a processor 701 and a machine-readable storage medium 702 that stores machine-executable instructions corresponding to a control logic of forwarding a packet. The processor 701 may communicate with the machine-readable storage medium 702 via a system bus 703. Also, the processor 701 may execute the method of forwarding a packet as described above by reading and executing the machine-executable instructions on the machine-readable storage medium 702. As shown in FIG. 7, the structure may also include a power assembly 704 configured to execute power management of the device, a wired or wireless network interface 705 configured to connect the device to a network, and an Input/Output (I/O) interface 706.

The machine-readable storage medium 702 mentioned herein may be any electronic, magnetic, optical or other physical storage devices and may contain or store information such as executable instructions, data and the like. For example, the machine readable storage medium may be: a Read-Only Memory (ROM), a volatile memory, a nonvolatile memory, a flash memory, a storage drive (e.g. hard disk drive), a solid state hard disk, any type of storage disk.

The machine-readable storage medium 702 is used to store the machine-executable instructions corresponding to the control logic of forwarding a packet. The machine-executable instructions include program instructions run by the obtaining unit 601, program instructions run by the advertising unit 602, and program instructions run by the processing unit 603.

For example, when the processor 701 reads and executes the machine-executable instructions on the machine-readable storage medium 702, the processor 701 is caused to perform the following operations:

obtaining a route of a specified role;

advertising the route to a remote VTEP in a way that the remote VTEP distributes packets to be transmitted to the specified role to VTEPs in a multihoming group based on the route, where the multihoming group includes VTEPs to which the specified role is homed, and a next hop of the route advertised to the remote VTEP is a group address of the multihoming group;

receiving a packet to be transmitted to the specified role from the remote VTEP; and transmitting the packet to another VTEP in the multihoming group when a link between the VTEP and the specified role fails, in a way that the packet is transmitted by the other VTEP to the specified role.

In an example, a Peer link is established between the VTEPs in the multihoming group in a serial way. When transmitting the packet to the other VTEP in the multihoming group, the processor 701 is caused by the machine-executable instructions to:

determine a VXLAN identifier VNI carried in the packet and perform a VXLAN de-capsulation on the packet to obtain a de-capsulated packet; and transmit the de-capsulated packet carrying a VLAN identifier corresponding to the VNI via the established Peer link.

In an example, when the link between the VTEP and the specified role fails, the processor 701 is caused by the machine-executable instructions to:

determine, in a route table, a route entry satisfying a condition that: an egress port of the route entry is a port on the VTEP that is connected with the failed link; and modify the egress port of the route entry to a Peer link port on the VTEP; and when transmitting the de-capsulated packet carrying the VLAN identifier corresponding to the VNI via the established Peer link, the processor is caused by the machine-executable instructions to:

determine a route entry in the route table based on the VNI and a destination address of the packet; and transmit the de-capsulated packet carrying the VLAN identifier corresponding to the VNI via the egress port in the determined route entry, where the egress port is a Peer link port.

In an example, the VTEP is a Board gateway. When the link between the VTEP and the specified role fails, the processor 701 is caused by the machine-executable instructions to:

determine and delete a route entry satisfying a condition in the route table, where the condition is that: an egress port of the route entry is a port on the VTEP that is connected with the failed link; and when transmitting the de-capsulated packet carrying the VLAN identifier corresponding to the VNI via the established Peer link, the processor is caused by the machine-executable instructions to:

determine, in the route table, a set first default route based on the VNI and the destination address of the packet and transmit the de-capsulated packet carrying the VLAN identifier corresponding to the VNI via the egress port of the first default route, where the egress port of the first default route is a Peer link port.

In an example, a VXLAN tunnel is established between the VTEPs in the multihoming group in a serial way; and when transmitting the packet to the other VTEP in the multihoming group, the processor 701 is caused by the machine-executable instructions to:

transmit the packet via the established VXLAN tunnel after modifying an outer layer IP header of the packet, where modifying the outer layer IP header of the packet includes: modifying a source IP address in the outer layer IP header to a Loopback address of the VTEP and modifying a destination IP address in the outer layer IP header to a Loopback address of another VTEP in the multihoming group that establishes the VXLAN tunnel with the VTEP.

In an example, when the link between the VTEP and the specified role fails, the processor 701 is caused by the machine-executable instructions to:

determine, in the route table, a route entry satisfying a condition that: an egress port of the route entry is a port on the VTEP that is connected with the failed link; and modify the egress port of the route entry to a Loopback address of another VTEP in the multihoming group that establishes the VXLAN tunnel with the VTEP; and when transmitting the packet via the established VXLAN tunnel after modifying the outer layer IP header of the packet, the processor is caused by the machine-executable instructions to:

determine a route entry in the route table based on the VNI carried in the packet and the destination address of the packet; and modify the source IP address of the outer layer IP header of the packet to the Loopback address of the VTEP and modify the destination IP address of the outer layer IP header to the egress port in the route entry, and transmit the packet to the egress port, where the egress port in the route entry is a Loopback address.

In an example, the VTEP is a Board gateway. When the link between the VTEP and the specified role fails, the processor 701 is caused by the machine-executable instructions to:

determine and delete a route entry satisfying a condition in the route table, where the condition is that an egress port of the route entry is a port on the VTEP that is connected with the failed link;

when transmitting the packet via the established VXLAN tunnel after modifying the outer layer IP header of the packet, the processor is caused by the machine-executable instructions to:

determine a set second default route in the route table based on the VNI carried in the packet and the destination address of the packet, modify the source IP address of the outer layer IP header of the packet to the Loopback address of the VTEP and modify the destination IP address of the outer layer IP header to the egress port of the second default route and transmit the packet to the egress port of the second default route, where the egress port of the second default route is the Loopback address of another VTEP in the multihoming group that establishes the VXLAN tunnel with the VTEP.

In an example, when obtaining a route of a specified role, the processor 701 is caused by the machine-executable instructions to:

learn the route through a packet transmitted by the specified role;

after obtaining the route, the processor 701 is caused by the machine-executable instructions to:

generate a route entry corresponding to the route and record it into a route table, transmit a synchronous message to another VTEP in the multihoming group, where the synchronous message carries the route and a VLAN identifier of a VLAN that the route belongs to; the route entry includes a destination address, a VXLAN identifier VNI carried in the packet, and an egress port and the destination address is the address of the specified role; the VNI corresponds to a VLAN that the specified role belongs to; and the egress port is a port on the VTEP that receives the packet transmitted by the specified role; or, when obtaining the route of the specified role, the processor 701 is caused by the machine-executable instructions to:

receive a synchronous message transmitted by another VTEP in the multihoming group and learn the route carried in the synchronous message from the received synchronous message;

after learning the route from the received synchronous message, the processor 701 is caused by the machine-executable instructions to:

generate a route entry corresponding to the route and record it into a route table where the generated route entry includes a destination address, a VNI, and an egress port, and the destination address is the address of the specified role; the VNI corresponds to a VLAN identifier carried in the synchronous message; and the egress port is a port on the VTEP that corresponds to the VLAN identifier carried in the synchronous message.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of forwarding a packet, comprising:
   obtaining, by a VXLAN Tunnel End Point (VTEP) in a multihoming group, a route of a specified role, wherein the multihoming group includes VTEPs to which the specified role is homed;
   advertising, by the VTEP, the route to a remote VTEP in a way that the remote VTEP distributes packets to be transmitted to the specified role to the VTEPs in the multihoming group based on the route, wherein a next hop of the route advertised to the remote VTEP is a group address of the multihoming group;
   receiving, by the VTEP, a packet to be transmitted to the specified role from the remote VTEP; and
   transmitting, by the VTEP, the packet to another VTEP in the multihoming group when a link between the VTEP and the specified role fails, in a way that the packet is transmitted by the other VTEP to the specified role.

2. The method of claim 1, wherein a Peer link is established serially between the VTEPs in the multihoming group; and
   transmitting the packet to the other VTEP in the multihoming group comprises:
      determining, by the VTEP, a VXLAN identifier (VNI) carried in the packet and performing a VXLAN de-capsulation on the packet to obtain a de-capsulated packet; and
      adding, by the VTEP, a VLAN identifier corresponding to the VNI into the de-capsulated packet and transmitting the de-capsulated packet with the VLAN identifier via the established Peer link.

3. The method of claim 2, further comprising:
   when the link between the VTEP and the specified role fails,
      determining, by the VTEP, in a route table, a route entry satisfying a condition that: an egress port of the route entry is a port on the VTEP connecting with the failed link; and
      modifying, by the VTEP, the egress port of the determined route entry to a Peer link port on the VTEP; and
   wherein adding a VLAN identifier corresponding to the VNI into the de-capsulated packet and transmitting the de-capsulated packet with the VLAN identifier via the established Peer link comprises:
      determining, by the VTEP, a route entry in the route table based on the VNI and a destination address of the packet; and
      adding, by the VTEP, the VLAN identifier corresponding to the VNI into the de-capsulated packet, and transmitting the de-capsulated packet with the VLAN identifier via the egress port in the determined route entry, wherein the egress port is a Peer link port.

4. The method of claim 2, wherein the VTEP is a Board gateway;
   the method further comprising:
   when the link between the VTEP and the specified role fails,
      determining a route entry satisfying a condition in the route table and deleting the route entry, wherein the condition is that: an egress port of the route entry is a port on the VTEP connecting with the failed link; and
   wherein adding a VLAN identifier corresponding to the VNI into the de-capsulated packet and transmitting the de-capsulated packet with the VLAN identifier via the established Peer link comprises:
      determining, by the VTEP, in the route table, a set first default route based on the VNI and the destination address of the packet and adding the VLAN identifier corresponding to the VNI into the de-capsulated packet and transmitting the de-capsulated packet with the VLAN identifier via the egress port of the first default route, wherein the egress port of the first default route is a Peer link port.

5. The method of claim 1, wherein a VXLAN tunnel is established serially between the VTEPs in the multihoming group; and
   transmitting the packet to the other VTEP in the multihoming group comprises:
      transmitting, by the VTEP, the packet via the established VXLAN tunnel after modifying an outer layer Internet Protocol (IP) header of the packet,
      wherein modifying the outer layer IP header of the packet comprises: modifying a source IP address in the outer layer IP header to a Loopback address of the VTEP and modifying a destination IP address in the outer layer IP header to a Loopback address of another VTEP in the multihoming group that establishes the VXLAN tunnel with the VTEP.

6. The method of claim 5, further comprising:
   when the link between the VTEP and the specified role fails,
      determining, by the VTEP, in the route table, a route entry satisfying a condition that: an egress port of the route entry is a port on the VTEP connecting with the failed link; and
      modifying, by the VTEP, the egress port of the determined route entry to a Loopback address of another VTEP in the multihoming group that establishes the VXLAN tunnel with the VTEP; and
   wherein transmitting the packet via the established VXLAN tunnel after modifying the outer layer IP header of the packet comprises:
      determining, by the VTEP, a route entry in the route table based on the VNI carried in the packet and the destination address of the packet; and
      modifying, by the VTEP, the source IP address of the outer layer IP header of the packet to the Loopback address of the VTEP and modifying the destination IP address of the outer layer IP header to the egress port of the determined route entry, and transmitting the modified packet to the egress port, wherein the egress port of the determined route entry is a Loopback address.

7. The method of claim 5, wherein the VTEP is a Board gateway;

the method further comprising:

determining, by the VTEP, a route entry satisfying a condition in the route table when the link between the VTEP and the specified role fails, and deleting the route entry, wherein the condition is that: an egress port of the route entry is a port on the VTEP connecting with the failed link; and wherein transmitting the packet via the established VXLAN tunnel after modifying the outer layer IP header of the packet comprises:

determining, by the VTEP, a set second default route in the route table based on the VNI carried in the packet and the destination address of the packet;

modifying, by the VTEP, the source IP address of the outer layer IP header of the packet to the Loopback address of the VTEP and the destination IP address of the outer layer IP header to the egress port of the second default route; and transmitting, by the VTEP, the modified packet to the egress port of the second default route, wherein the egress port of the second default route is the Loopback address of another VTEP in the multihoming group that establishes the VXLAN tunnel with the VTEP.

8. A VXLAN Tunnel End Point (VTEP), comprising:

a processor; and a machine-readable storage medium that stores machine-executable instructions, wherein by reading and executing the machine-executable instructions, the processor is caused to:

obtain a route of a specified role;

advertise the route to a remote VTEP in a way that the remote VTEP distributes packets to be transmitted to the specified role to VTEPs in a multihoming group based on the route, wherein the multihoming group includes the VTEPs to which the specified role is homed, and a next hop of the route advertised to the remote VTEP is a group address of the multihoming group;

receive a packet to be transmitted to the specified role from the remote VTEP; and transmit the packet to another VTEP in the multihoming group when a link between the VTEP and the specified role fails, in a way that the packet is transmitted by the other VTEP to the specified role.

9. The VTEP of claim 8, wherein a Peer link is established serially between the VTEPs in the multihoming group; and when transmitting the packet to the other VTEP in the multihoming group, the processor is caused by the machine-executable instructions to:

determine a VXLAN identifier (VNI) carried in the packet and perform a VXLAN de-capsulation on the packet to obtain a de-capsulated packet; and add a VLAN identifier corresponding to the VNI into the de-capsulated packet and transmit the de-capsulated packet with the VLAN identifier via the established Peer link.

10. The VTEP of claim 9, wherein, when the link between the VTEP and the specified role fails, the processor is caused by the machine-executable instructions to:

determine, in a route table, a route entry satisfying a condition that: an egress port of the route entry is a port on the VTEP connecting with the failed link; and modify the egress port of the determined route entry to a Peer link port on the VTEP; and when adding a VLAN identifier corresponding to the VNI into the de-capsulated packet and transmitting the de-capsulated packet with the VLAN identifier via the established Peer link, the processor is caused by the machine-executable instructions to:

determine a route entry in the route table based on the VNI and a destination address of the packet; and add the VLAN identifier corresponding to the VNI into the de-capsulated packet, and transmit the de-capsulated packet with the VLAN identifier via the egress port in the determined route entry, wherein the egress port is a Peer link port.

11. The VTEP of claim 9, wherein the VTEP is a Board gateway;

when the link between the VTEP and the specified role fails, the processor is caused by the machine-executable instructions to:

determine a route entry satisfying a condition in the route table and delete the route entry, wherein the condition is that: an egress port of the route entry is a port on the VTEP connecting with the failed link; and when adding a VLAN identifier corresponding to the VNI into the de-capsulated packet and transmitting the de-capsulated packet with the VLAN identifier via the established Peer link, the processor is caused by the machine-executable instructions to:

determine, in the route table, a set first default route based on the VNI and the destination address of the packet and add the VLAN identifier corresponding to the VNI into the de-capsulated packet and transmit the de-capsulated packet with the VLAN identifier via the egress port of the first default route, wherein the egress port of the first default route is a Peer link port.

12. The VTEP of claim 8, wherein a VXLAN tunnel is established serially between the VTEPs in the multihoming group; and when transmitting the packet to the other VTEP in the multihoming group, the processor is caused by the machine-executable instructions to:

transmit the packet via the established VXLAN tunnel after modifying an outer layer Internet Protocol (IP) header of the packet, wherein modifying the outer layer IP header of the packet comprises: modifying a source IP address in the outer layer IP header to a Loopback address of the VTEP and modifying a destination IP address in the outer layer IP header to a Loopback address of another VTEP in the multihoming group that establishes the VXLAN tunnel with the VTEP.

13. The VTEP of claim 12, wherein, when the link between the VTEP and the specified role fails, the processor is caused by the machine-executable instructions to:

determine, in the route table, a route entry satisfying a condition that: an egress port of the route entry is a port on the VTEP connecting with the failed link; and modify the egress port of the determined route entry to a Loopback address of another VTEP in the multihoming group that establishes the VXLAN tunnel with the VTEP; and when transmitting the packet via the established VXLAN tunnel after modifying the outer layer IP header of the packet, the processor is caused by the machine-executable instructions to:

determine a route entry in the route table based on the VNI carried in the packet and the destination address of the packet; and modify the source IP address of the outer layer IP header of the packet to the Loopback address of the VTEP and modify the destination IP address of the outer layer IP header to the egress port in the determined route entry, and transmit the modified packet to the egress port, wherein the egress port in the determined route entry is a Loopback address.

14. The VTEP of claim 12, wherein the VTEP is a Board gateway;

when the link between the VTEP and the specified role fails, the processor is caused by the machine-executable instructions to:

determine a route entry satisfying a condition in the route table, and delete the route entry, wherein the condition is that: an egress port of the route entry is a port on the VTEP connecting with the failed link; and when transmitting the packet via the established VXLAN tunnel after modifying the outer layer IP header of the packet, the processor is caused by the machine-executable instructions to:

determine a set second default route in the route table based on the VNI carried in the packet and the destination address of the packet;

modify the source IP address of the outer layer IP header of the packet to the Loopback address of the VTEP and the destination IP address of the outer layer IP header to the egress port of the second default route; and transmit the modified packet to the egress port of the second default route, wherein the egress port of the second default route is the Loopback address of another VTEP in the multihoming group that establishes the VXLAN tunnel with the VTEP.

\* \* \* \* \*